United States Patent
Mittal

(10) Patent No.: US 9,313,508 B1
(45) Date of Patent: Apr. 12, 2016

(54) FEEDING INTRA-CODED VIDEO FRAME AFTER PORT RECONFIGURATION IN VIDEO TELEPHONY

(71) Applicant: QUALCOMM Incorporated, San Diego, CA (US)

(72) Inventor: Sanjeev Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/527,626

(22) Filed: Oct. 29, 2014

(51) Int. Cl.
| | |
|---|---|
| H04N 7/14 | (2006.01) |
| H04N 19/146 | (2014.01) |
| H04N 19/105 | (2014.01) |
| H04N 19/172 | (2014.01) |
| H04N 19/513 | (2014.01) |
| H04L 29/06 | (2006.01) |

(52) U.S. Cl.
CPC ............ *H04N 19/146* (2014.11); *H04L 65/602* (2013.01); *H04L 65/608* (2013.01); *H04N 19/105* (2014.11); *H04N 19/172* (2014.11); *H04N 19/513* (2014.11)

(58) Field of Classification Search
CPC . H04N 19/115; H04N 19/152; H04N 19/159; H04N 19/164; H04N 19/172; H04N 19/188; H04N 19/42; H04N 19/61; H04N 19/895; H04N 21/234381; H04N 21/23655; H04N 21/2402; H04N 21/2662; H04N 21/44004; H04N 21/44209; H04N 7/14–7/15
See application file for complete search history.

(56) References Cited

U.S. PATENT DOCUMENTS

| | | | |
|---|---|---|---|
| 6,754,241 B1 * | 6/2004 | Krishnamurthy .. | H04N 21/2365 348/423.1 |
| 8,842,555 B2 | 9/2014 | Tinnakornsrisuphap et al. | |
| 2008/0259796 A1 | 10/2008 | Abousleman et al. | |
| 2010/0085959 A1 | 4/2010 | Vohra et al. | |
| 2011/0164679 A1 | 7/2011 | Satou et al. | |
| 2013/0057639 A1 * | 3/2013 | Ralston ............... | H04L 12/1827 348/14.02 |
| 2013/0195204 A1 | 8/2013 | Reznik et al. | |
| 2013/0235152 A1 | 9/2013 | Hannuksela et al. | |
| 2014/0118462 A1 * | 5/2014 | Zhao .................... | H04W 76/022 348/14.02 |
| 2014/0280679 A1 | 9/2014 | Dey et al. | |
| 2015/0103885 A1 * | 4/2015 | Feng .................... | H04N 19/107 375/240.02 |

FOREIGN PATENT DOCUMENTS

| | | |
|---|---|---|
| EP | 2290980 A2 | 3/2011 |
| WO | 2007073508 A1 | 6/2007 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Stella L Woo

(74) *Attorney, Agent, or Firm* — Shumaker & Sieffert, P.A.

(57) ABSTRACT

An apparatus configured for video telephony includes a receiving device configured to receive video data at a first bitrate; send a request to change the first bitrate to a second bitrate; receive a first intra coded picture in response to the request to change the first bitrate to the second bitrate; in response to detecting the second bitrate, flush the first intra coded picture from a picture buffer; and in response to flushing the first intra coded picture from the picture buffer, send a request for a second intra coded picture.

30 Claims, 4 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

"3rd Generation Partnership Project; Technical Specification Group Services and System Aspects; IP Multimedia Subsystem (IMS); Multimedia Telephony; Media handling and interaction (Release 12) (extract)," 3GPP Draft; 26114 C60, 3rd Generation Partnership Project (3GPP), France, Jun. 23, 2014; XP002753231, 62 pp.

International Search Report and Written Opinion from International Application No. PCT/US2015/056224 dated Feb. 1, 2016, 14 pp.

Jammeh, et al., "Quality of Experience (QoE) Driven Adaptation Scheme for voice/video over IP," Telecommunication Systems; Modeling, Analysis Design and Management, Kluwer Academic Publishers, BO, vol. 49, No. 1, Jun. 9, 2010, XP019991728, 13 pp.

\* cited by examiner

US 9,313,508 B1

FEEDING INTRA-CODED VIDEO FRAME AFTER PORT RECONFIGURATION IN VIDEO TELEPHONY

TECHNICAL FIELD

The disclosure relates to video telephony and, more particularly, to coding and transmitting video data in a video telephony session.

BACKGROUND

Communication devices, such as mobile phones, may include an audio capture device, such as a microphone or speech synthesizer, an audio encoder to generate audio packets (or frames), a video capture device, such as a camera, and a video encoder to generate video frames. The communication device may use communication protocol layers, such as real-time transport protocol (RTP), radio link protocol (RLP), medium access control (MAC), and physical (PHY) layers. In a video telephony application, the communication device may place video and audio RTP packets in a RLP queue. A MAC layer module may generate MAC layer packets from contents of the RLP queue. The MAC layer packets may be converted to PHY layer packets for transmission across a communication channel to another communication device.

SUMMARY

This disclosure relates to video telephony (VT) and, more particularly, to techniques for implementing bit rate adaptation during a VT session.

In one example, a method for video telephony includes receiving video data at a first bitrate as part of an active video telephony session; sending a request to change the first bitrate to a second bitrate; receiving a first intra coded picture in response to the request to change the first bitrate to the second bitrate; in response to detecting the second bitrate, flushing the first intra coded picture from a picture buffer; and, in response to flushing the first intra coded picture from the picture buffer, sending a request for a second intra coded picture.

In another example, an apparatus configured to perform video telephony includes means for receiving video data at a first bitrate as part of an active video telephony session; means for sending a request to change the first bitrate to a second bitrate; means for receiving a first intra coded picture in response to the request to change the first bitrate to the second bitrate; means for flushing the first intra coded picture from a picture buffer in response to detecting the second bitrate; and, means for sending a request for a second intra coded picture in response to flushing the first intra coded picture from the picture buffer.

In another example, an apparatus configured for video telephony includes a receiving device configured to receive video data at a first bitrate as part of an active video telephony session; send a request to change the first bitrate to a second bitrate; receive a first intra coded picture in response to the request to change the first bitrate to the second bitrate; in response to detecting the second bitrate, flush the first intra coded picture from a picture buffer; and, in response to flushing the first intra coded picture from the picture buffer, send a request for a second intra coded picture.

In another example, a computer-readable storage medium stores instructions that when executed by one or more processors cause the one or more processors to receive video data at a first bitrate as part of an active video telephony session; send a request to change the first bitrate to a second bitrate; receive a first intra coded picture in response to the request to change the first bitrate to the second bitrate; in response to detecting the second bitrate, flush the first intra coded picture from a picture buffer; and, in response to flushing the first intra coded picture from the picture buffer, send a request for a second intra coded picture.

The details of one or more examples are set forth in the accompanying drawings and the description below. Other features, objects, and advantages will be apparent from the description and drawings, and from the claims.

DETAILED DESCRIPTION

Figure 1:
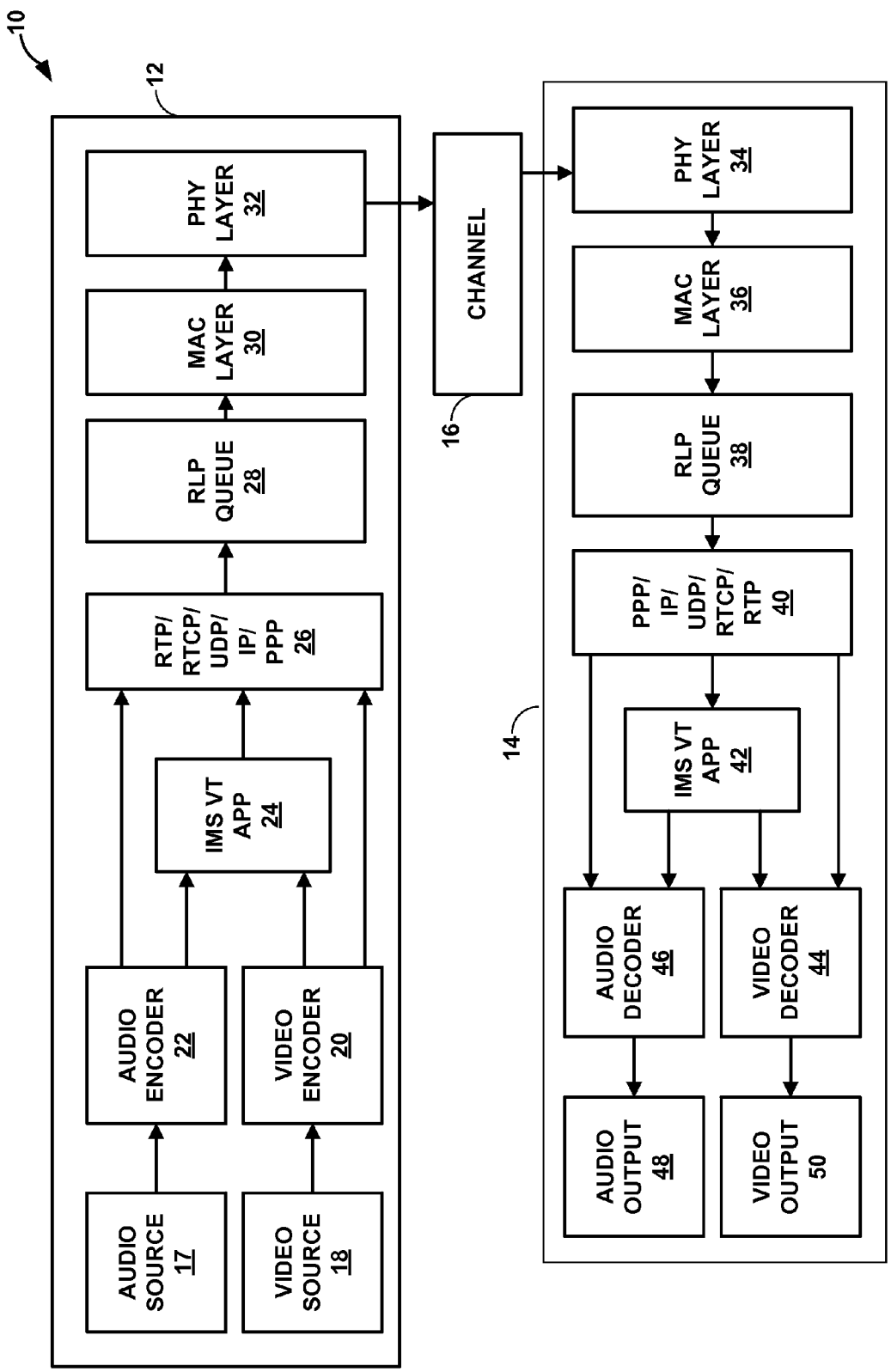
FIG. 1 illustrates a video and audio encoding and decoding system that may be provided within a communication device to support video telephony.

This disclosure relates to video telephony (VT) and, more particularly, to techniques for implementing bit rate adaptation during a VT session. VT generally refers to real-time communication that includes both video and audio, as opposed to traditional telephony which is audio only. During a VT session, communication devices at different locations transmit and receive packets carrying audio and video data over a network such as the internet.

The communication devices, which may alternatively be referred to as VT devices, may be equipped for wired and/or wireless communication. The VT devices may be dedicated to VT applications or be equipped to support any of a wide variety of other computing applications such as web browsing, gaming, word processing, graphics processing, video and/or audio entertainment, and location tracking, e.g., in addition to VT applications. In some examples, the VT devices may be so-called smartphones, tablets, or wearable smart devices.

The packets generated by a VT device may, for example, be transmitted according to the Real-Time Transport Protocol (RTP) which defines a standardized packet format. Additionally, the VT devices may transmit and receive information packets according to the RTP Control Protocol (RTCP), which defines a standardized packet format for transmitting out-of-band statistics and control information for an RTP session.

To reduce the amount of data that needs to be transmitted over the network, VT devices include audio and video encoders and decoders. The video encoder of a first VT device typically compresses video data captured by a camera using a variety of video compression tools, while the video decoder of a second VT device generally performs reciprocal techniques to those of the video encoder in order to decode the encoded video data for playback at the second VT device.

The video encoder of a VT device encodes captured video as a series of pictures, where a picture may refer to a frame of video data or, in the case of interlaced video, may refer to a field of video data. The video encoder generates a series of intra-coded pictures (I-pictures) and predicted pictures (P- or B-pictures). I-pictures can be decoded without reference to other pictures but typically provide less compression than P- and B-pictures. P- and B-pictures, in contrast, utilize information of a previously decoded picture, and thus may be more susceptible to errors, but provide more compression compared to I-pictures. A P-picture is predicted relative to another picture. A B-picture is predicted relative to two other pictures. For encoding a P- or B-picture, a greater number of coding tools are available to a video encoder than when encoding an I-picture. As one example, a block of a P-picture may be predicted based on a block in an already decoded picture, predicted based on other pixel values in the P-picture, or not predicted at all. As I-pictures do not rely on previously decoded pictures, a block in an I-picture, by contrast, cannot be predicted based on a block of an already decoded picture. Instead, a block in an I-picture is decoded based on pixels already decoded within the I-picture. The availability of fewer coding tools generally results in I-pictures providing less compression than P-pictures and B-pictures.

Successive P- or B-pictures may result in errors being propagated from one picture to the next until the video decoder receives an I-picture. Additionally, as P- or B-pictures are decoded using previously decoded pictures, a video decoder may not be able to properly decode a P- or B-picture if a picture upon which the P- or B-picture relies was not properly decoded, due, for example, to packet loss. In these instances, the video decoder may, for a few seconds, generate video that is unrecognizable or may not be able to generate any video at all until another I-picture is received. This few seconds of poor video or no video may diminish user experience. In order to improve video quality and to improve error resiliency, video encoders are typically configured to periodically include I-pictures in the encoded video bitstream, with more I-pictures typically improving video quality but reducing overall video compression and fewer I-pictures reducing video quality but improving overall video compression.

Video encoders are typically configured to generate I-pictures in response to detecting a large amount of change in the pictures being encoded. A large amount of change in pictures may, for example, occur when the camera moves, and the entire scene of one picture is different than that of recently coded pictures. In contrast, a low amount of change in pictures may occur when a camera is in a fixed position focused on objects that are only slightly moving. For example, in a VT session where the camera is focused on a fixed person or group of people, the movement of the people is typically small, and portions of the background may change slightly or not at all. In such a scenario, a VT device may increase the amount of time between I-pictures. Even in scenarios where there is no change or virtually no change in pictures, VT devices may still periodically send I-pictures in order to improve video quality and improve error resiliency.

Original equipment manufacturers (OEMs) are introducing to market high definition video telephony (HDVT) devices which support higher resolution video than previous generation VT devices. In order to support HDVT, these HDVT devices typically send and receive encoded audio and video data over a network at higher bitrates compared to the previous generation of VT devices. When network conditions or other system conditions do not permit the bitrates necessary for HDVT, the HDVT devices are typically configured to implement rate adaptation protocols that cause the devices to change an active VT session to a lower bitrate. As part of switching to the lower bitrate, HDVT devices generally switch from higher resolution video to lower resolution video, as well as potentially reducing an audio sampling rate, reducing a frame rate, or performing other such modification to the audio and video data in order to reduce the amount of data being transmitted.

Examples of video resolutions include QVGA (320×240 resolution), VGA (640×480 resolution), and SVGA (800×600 resolution), as well as high-definition resolutions such as HD (1280×720 resolution) and full HD (1920×1080 resolution). These are merely a few of the widely used video resolutions. As part of switching to a lower bitrate, a video encoder may, for example, stop encoding video data at SVGA and start encoding the video data at VGA or QVGA. An HDVT device may, for example, stop encoding video data at full HD and start encoding the video data at HD, or in the case of a large reduction in the bitrate, may start encoding the video data at SVGA, VGA, or QVGA resolution. It should be understood that these resolutions are merely examples, and a VT device configured to implement the techniques of this disclosure is not limited to any particular resolution or resolutions. Additionally, although the techniques of this disclosure are generally described with reference to a reduction in the resolution of video being encoded, it should be understood that the techniques of this disclosure are also compatible with increases in the resolution of video being encoded.

As introduced above, two devices participating in a VT session may exchange RTCP messages regarding the status of the VT session. The RTCP messages may, for example, include audio-visual profile with feedback (AVPF) messages with encoder-decoder ("codec") control information. AVPF refers to the extended RTP profile for RTCP-based feedback. A codec generally refers to the software, hardware, or combination thereof, that is configured to implement (e.g. encode and/or decode video data according to) a particular video coding standard, several examples of which are provided below. Thus, the RTCP messages with codec control information may, for example, affect the manner in which a video encoder encodes video data. For example, a first VT device may receive an RTCP message with codec control information from a second VT device, and in response to receiving the RTCP message with the codec control information, the first VT device may alter the manner in which it encodes video data. As will be explained in greater detail below, examples of an RTCP message with codec control information include requests for intra coded pictures, picture loss indication (PLI) messages, and full intra request (FIR) messages.

A first VT device may send to a second VT device, as one or more RTCP messages, a sender's report indicating how many packets the first VT device has sent. If the second VT device determines there is a discrepancy between the number of packets sent by the first VT device and the number of packets received by the second VT device, then the second VT device may send a temporary maximum media stream bitrate request (TMMBR) RTCP message which instructs the first VT device to start transmitting at a lower bitrate. The second VT device may send the TMMBR RTCP message to the first VT device in order to limit the maximum bit rate of the media stream (including both audio and video data) received from the first VT device. In response to receiving the TMMBR RTCP message, the first VT device may start generating A/V data at a lower bitrate, and in order to achieve the lower bitrate, may lower the resolution of the video being sent as part of the VT session.

When switching from a higher bitrate to a lower bitrate, the video encoder of the first VT device may generate new sequence parameter set (SPS) information and picture parameter set (PPS) information, as well as a new I-picture, for the video data that is generated by the video encoder. A PPS includes information that remains unchanged while coding a picture associated with the PPS, and an SPS includes information that remains unchanged while coding a sequence of pictures associated with the SPS. Examples of the types of information that may be included in a PPS or SPS are resolution information, optional coding modes that are enabled, block structure information for pictures, and other such information regarding the encoded video.

The first VT device may send the new SPS and PPS separately from the I-picture in order to improve error resiliency. When the video decoder of the second VT device parses the information received in the new SPS and PPS, the video decoder may determine that the resolution of the video being received is about to change, and in response to the new SPS and PPS, the video decoder of the second VT device may perform port reconfiguration. Port reconfiguration may, for example, involve flushing a buffer that includes the separately sent I-picture. If the I-picture is flushed from the buffer, then the second VT device may not be able to properly decode subsequently sent P-pictures and B-pictures until a new I-picture is received, resulting in a period of poor video or no video. The poor video may result from the P-pictures and B-pictures being dependent on the flushed I-picture, which the second VT device no longer has stored in its coded picture buffer due to the second VT device flushing the buffer as part of the port reconfiguration operation. In such a scenario, the first VT device does not know that the second VT device flushed the I-picture from the buffer, and therefore, the first VT device may continue to send B- and P-pictures for several seconds, resulting in a bad user experience during those several seconds.

According to the techniques of this disclosure, in order to avoid or reduce this period of poor or no video, the second VT device may be configured to send an I-picture request message in response to detecting a port reconfiguration. Additionally or alternatively, the second VT device may be configured to send an I-picture request message in response to detecting a flushing of a coded picture buffer that stores decoded pictures. The I-picture request message may, for example, be a picture loss indication (PLI) message over RTCP, a full intra request (FIR) message over RTCP, or some other such type of I-picture request message. Without sending the I-picture request message, the first device would continue to code video data under the assumption that the second VT device has the flushed I-picture stored and thus can use the stored I-picture for predicting subsequent P- and B-pictures. Accordingly, the second device would not receive another I-picture until the first device sent another I-picture based on either a time between I-pictures or detected changes in the video being encoded, which may be several seconds or even up to ten seconds in some instances. By sending the I-picture request message in response to flushing its coded picture buffer, the second VT device may reduce this time without an I-picture, thus improving overall user experience by reducing the amount of time with poor video quality.

In the context of this disclosure, a port refers to a software construct serving as an interface to a data stream. The port uniquely identifies different applications or processes running on the VT device. Port configuration parameters define the format of the data to be transferred on a component port. The process of changing these parameters is generally referred to as port reconfiguration.

FIG. 1 illustrates a video encoding and decoding system 10 that may utilize the techniques of this disclosure. The system 10 includes an encoder system 12 sending data across a transmission channel 16 to a decoder system 14. The encoder system 12 may be in a first video communication device and may include an audio source 17, video source 18, video encoder 20, audio encoder 22, an IP multimedia subsystem (IMS) VT application module 24, real-time transport protocol (RTP)/RTCP/user datagram protocol (UDP)/Internet protocol (IP)/point-to-point protocol (PPP) conversion module 26, radio link protocol (RLP) queue 28, MAC layer module 30 and physical (PHY) layer module 32. In other examples, encoder system 12 may include other elements instead of or in addition to the elements shown in FIG. 1. Other examples of the encoder system 12 may include fewer elements than those shown in FIG. 1.

The decoder system 14 may be in another video communication device and may include a PHY layer module 34, MAC layer module 36, RLP queue 38, RTP/RTCP/UDP/IP/PPP conversion module 40, IMS VT application module 42, video decoder 44, audio decoder 46, audio output unit 48 and video output unit 50. In other examples, decoder system 14 may include other elements instead of or in addition to the elements shown in FIG. 1. Other examples of the decoder system 14 may include fewer elements than those shown in FIG. 1.

System 10 may provide bi-directional video and audio transmission, e.g., for VT sessions via transmission channel 16. Reciprocal encoding, decoding, and conversion modules may be provided on opposite ends of channel 16. In some embodiments, encoder system 12 and decoder system 14 may be embodied within video communication devices such as wireless mobile terminals equipped for video streaming, VT, or both. The mobile terminals may support VT according to packet-switched standards such as RTP, RTCP, UDP, IP, or PPP.

RTP/RTCP/UDP/IP/PPP conversion module 26 adds appropriate RTP/RTCP/UDP/IP/PPP header data to audio and video data received from audio encoder 22 and video encoder 20 and to control information received from IMS VT application module 24, and places the data in RLP queue 28. RTP runs on top of UDP, while UDP runs on top of IP, and IP runs on top of PPP. MAC layer module 30 generates MAC RLP packets from the contents of RLP queue 28. PHY layer module 32 converts the MAC RLP packets into PHY layer packets for transmission over channel 16.

PHY layer module 34 and MAC layer module 36 of decoding system 14 operate in a reciprocal manner. PHY layer module 34 converts PHY layer packets received from channel 16 to MAC RLP packets. MAC layer module 36 places the MAC RLP packets into RLP queue 38. RTP/RTCP/UDP/IP/PPP conversion module 40 strips the header information from the data in RLP queue 38, and reassembles the video and audio data for delivery to video decoder 44 and audio decoder 46, respectively. RTP/RTCP/UDP/IP/PPP conversion module 40 likewise strips the header information from the data in RLP queue 38 and reassembles the control information for delivery to IMS VT application module 42. Video decoder 44 and audio decoder 46 may, in conjunction with IMS VT application module 42, make video and audio decoding decisions based on the received control information. The control information may, for example, include a sender's report, based on which IMS VT application module 42 can determine if a transmission bitrate for device 12 should be altered. As part of altering the bit rate, IMS VT application module 42 may adjust the resolution at which video data is being encoded.

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, wireless communication may be performed according to cdma2000, wideband CDMA (WCDMA) standards, 3G, 4G, LTE, or any other CDMA-based air interfaces. TDMA may be delivered according to the Global System for Mobile Communications (GSM) standard. The Universal Mobile Telecommunication System (UMTS) standard permits GSM or WCDMA operation. For VT applications, system 10 may be designed to support high data rate (HDR) technologies such as cdma2000 1×EV-DO, Release 0, Revision A or subsequent EV-DO releases.

The video source 18 may be a video capture device, such as one or more video cameras, one or more video archives, or a combination of video cameras and video archives. Video source 18 may further include the ability to capture, generate, and/or include computer generated graphics. The video encoder 20 generates encoded video data according to a video compression method, such as MPEG-4, ITU-T H.264/AVC (Advanced Video Coding (AVC)), or ITU-T H.265 (High Efficiency Video Coding (HEVC)). Other video compression methods may also be used, such as the International Telecommunication Union (ITU) H.263, VP9, MPEG-2, or other standardized or proprietary methods. Video encoder 20 may provide a video source rate control scheme that is generally CODEC-dependent. For example, video encoder 20 may be adapted for video encoding according to HEVC, MPEG4, ITU H.263, ITU H.264 or another standard or technique. In one example, video encoder 20 may be implemented by a DSP or embedded logic core.

The audio source 17 may be an audio capture device, such as a microphone, or a speech synthesizer device. The audio encoder 22 may encode audio data to accompany the video data. The audio data may be encoded according to an audio compression method, such as adaptive multi-rate narrow band (AMR-NB), or other techniques. For VT applications, the video will permit viewing of a party to a VT conference, and the audio will permit the speaking voice of that party to be heard.

In operation, RTP/RTCP/UDP/IP/PPP conversion module 26 obtains video and audio data packets from video encoder 20 and audio encoder 22. RTP/RTCP/UDP/IP/PPP conversion module 26 adds appropriate header information to the audio packets and inserts the resulting data within RLP queue 28. Likewise, RTP/RTCP/UDP/IP/PPP conversion module 26 adds appropriate header information to the video packets and inserts the resulting data within RLP queue 28. MAC layer module 30 retrieves data from RLP queue 28 and forms MAC layer packets. Each MAC layer packet carries RTP/RTCP/UDP/IP/PPP header information and audio or video packet data that is contained within RLP queue 28.

Audio packets may be inserted into RLP queue 28 independently of video packets. In some cases, a MAC layer packet generated from the contents of RLP queue 28 will carry only header information and video packet data. In other cases, the MAC layer packet will carry only header information and audio packet data.

In some cases, the MAC layer packet will carry header information, audio packet data and video packet data, depending on the contents of RLP queue 28. The MAC layer packets may be configured according to a radio link protocol (RLP), and may be referred to as MAC RLP packets. PHY layer module 32 converts the MAC RLP audio-video packets into PHY layer packets for transmission across channel 16.

Channel 16 carries the PHY layer packets to decoder system 14. For example, channel 16 may be a wired connection, such as a local or wide-area wired network. Alternatively, as described herein, channel 16 may be a wireless channel such as a cellular, satellite or optical channel. Channel 16 may also be a combination of wireless and wired channels.

Channel conditions may be a concern for wired and wireless channels, but are especially problematic for mobile VT applications performed over a wireless channel 16, in which channel conditions may suffer due to fading or congestion. For example, channel 16 may be characterized by a reverse link (RL) having a throughput that varies according to channel conditions. Throughput may be estimated based on channel conditions, as represented by one or more of current wireless channel transmit rate, wireless base station activity, and transmit power limitations. For example, the channel conditions may be determined based on current MAC layer data rate, a reverse activity bit (RAB), and a power amplifier (PA) limit.

Video encoder 20 may maintain a virtual video buffer representing an amount of the encoded video relative to a target encoding rate. The target encoding rate may be a maximum encoding rate specified for video packets transmitted over channel 16. Video encoder 20 may control an actual encoding rate of the video from video source 18.

PHY layer module 34 of decoder system 14 identifies the MAC layer packets from the PHY layer packets and reassembles the content into MAC RLP packets. MAC layer module 36 then reassembles the contents of the MAC RLP packets to provide video and audio packets for insertion within RLP queue 38. RTP/RTCP/UDP/IP/PPP module 40 removes the accompanying header information and provides video packets to video decoder 44 and audio packets to audio decoder 46.

Video decoder 44 decodes the video data frames to produce a stream of video data for use in driving a display device forming part of video output device 50. Audio decoder 46 decodes the audio data to produce audio information for presentation to a user, e.g., via an audio speaker forming part of audio output device 48.

Video telephony refers to real-time communication of packets carrying audio and video data between at least two devices, such as systems 12 and 14. A first VT device 12 includes a video encoder 20 that obtains video from video source 18, which may, for example, be a video camera or video archive, and generates video packets. Similarly, an audio encoder 22 in the VT device 12 obtains audio from audio source 17, which may, for example, be a microphone or speech synthesizer, and generates audio packets. The video packets and audio packets are placed in a RLP queue 28. A MAC layer module 30 generates MAC layer packets from the contents of the RLP queue 28. The MAC layer packets are converted to PHY layer packets for transmission across a communication channel 16 to a second VT device 14.

In mobile VT applications, a VT device (wireless terminal) receives PHY layer packets via a wireless forward link (FL) (i.e., "downlink") from a base station. A VT device transmits PHY layer packets via a wireless reverse link (RL) (i.e., "uplink") to a base station. Each VT device includes PHY and MAC layers to convert the received PHY and MAC layer packets and reassemble the packet payloads into audio packets and video packets. A video decoder 44 within the VT device decodes the video data for presentation to a user via a display device (video output) 50. An audio decoder 46 within the VT device decodes the audio data for output via an audio speaker (audio output) 48.

Figure 2:
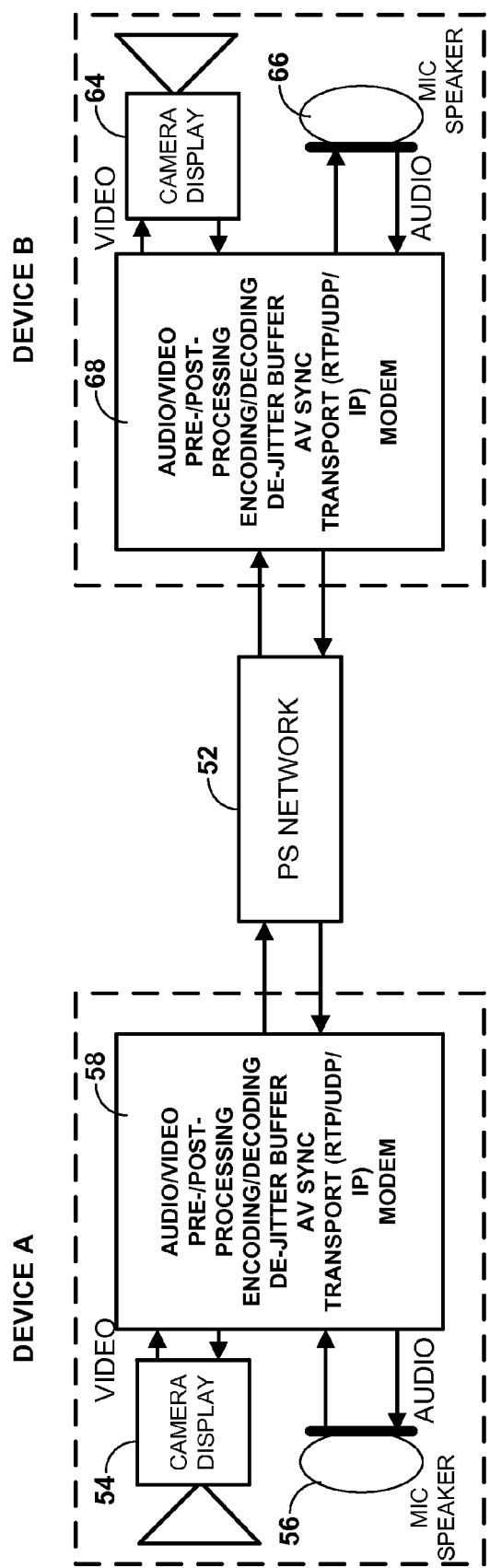
FIG. 2 depicts a simplified block diagram of a 2-way VT call over a generic packet-switched (PS) network

FIG. 2 depicts a simplified block diagram of a 2-way VT call over a generic packet-switched (PS) network 52. PS network 52 can be LTE, HSPA, (e)HRPD, WiFi, satellite, coax cable, power line communication, and the like, or a combination of any of the above. Devices A and B of FIG. 2 may generally be configured to conform to devices 12 and 14 of FIG. 1. On the transmit side of Device A, the audio/video of the VT call are captured at mic/speaker 56 and camera/display 54, pre-processed, if applicable, encoded/compressed, RTP/RTCP/UDP/IP packetized, and passed to the modem by processing unit 58. On the receive side of Device A, the received audio/video packets are demodulated, dispacketized, de-jittered, decoded, AV synced and post-processed, if applicable, by processing unit 58 before sent to mic/speaker 56 and camera/display 54.

Likewise, on the transmit side of Device B, the audio/video of the VT call are captured at mic/speaker 66 and camera/display 64, pre-processed, if applicable, encoded/compressed, RTP/RTCP/UDP/IP packetized, and passed to the modem by processing unit 68. On the receive side of Device B, the received audio/video packets are demodulated, dispacketized, de-jittered, decoded, AV synced and post-processed, if applicable, by processing unit 68 before sent to mic/speaker 66 and camera/display 64.

Audio/video RTCP packets are also sent along with the audio/video RTP packets for AV sync, media performance related statistics, rate adaptation, and the like. RTCP packets occur less frequently than RTP packets. That is, the control information of the RTCP packets are typically signaled every 500 ms to every 2 seconds, while RTP packets occur more frequently.

During a typical two-party VT session, video may be paused one or more times in one or both directions as a result of a user action. For example, a user on either side might move a VT application to the background on the device to briefly perform some other tasks. For example, in the middle of a VT call, one of the users may use the phone camera to take a picture, quickly check email, or perform another task. As a result, the camera resource for the VT call may be released and, in this case, no video is sent over to the peer side. That is, when a user moves a VT application to the background, video is typically no longer sent to other party in the VT call. Video may be stopped because the user of the VT app in the background can no longer see a preview window that indicates what video is being transmitted. To provide for increased privacy, and to avoid sending video without notice, the VT app will typically cease sending video RTP packets. However, audio packets would continue and the VT is not dropped. The phenomenon, in which a video stream stops flowing in one or more directions, while the voice conversation continues, is typically called video pause.

FIGS. 1 and 2 show examples of systems that may implement the video telephony techniques of this disclosure. For example, a first VT device (e.g. one of device 12 or device 14 of FIG. 1 or one of Device A or Device B of FIG. 2) may be configured to receive video telephony data at a first bitrate from a second VT device (e.g. the other of device 12 or device 14 of FIG. 1 or the other of Device A or Device B of FIG. 2). The first VT device may send, to the second VT device, a request to change the first bitrate to a second bitrate. The VT device may receive from the second VT device, a first intra coded picture in response to the request to change the first bitrate to the second bitrate. In response to detecting the second bitrate, the first VT device may flush the first intra coded picture from a picture buffer. In response to flushing the first intra coded picture from the picture buffer, the first VT device may send, to the second VT device, a request for a second intra coded picture.

Figure 3:
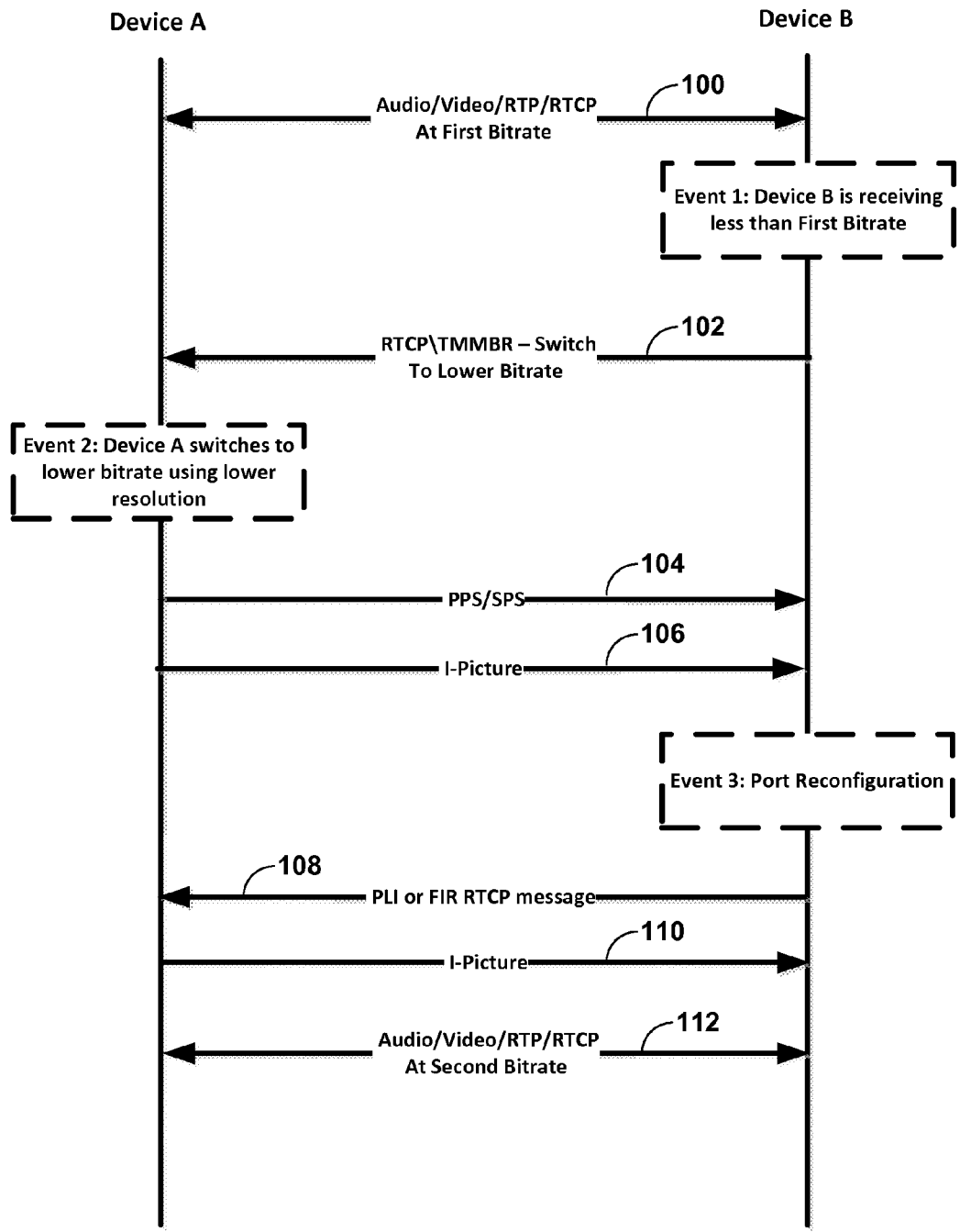
FIG. 3 is a conceptual diagram showing the signal flow for a portion of a VT session according to the techniques of this disclosure.

FIG. 3 is a conceptual diagram showing the signal flow for dynamic resolution change according to the techniques of this disclosure. The example of FIG. 3 will be described with reference to device A and device B, which may generally correspond to device A and device B of FIG. 2, as well as to device 12 and device 14 of FIG. 1. Although not explicitly shown in FIG. 3, device A and device B may be configured to communication across a network such as a packet switched network. In the example of FIG. 3, device A and device B have established an active video telephony session and are exchanging audio and video data over RTP as well as session information over RTCP (shown in FIG. 1 as packets 100). At Event 1, device B detects a reduction in the bitrate being received. Device B may, for example, receive as part of packets 100 a sender report RTCP packet including sender information such as an indication of how many RTP packets have been sent by Device A since starting transmission. In response to determining that the rate at which device B is receiving packets is lower than the rate at which device A is sending packets, device B may send, to device A, TMMBR RTCP message 102 requesting that device A switch to a lower bitrate. For example, if device A is transmitting at 1000 kbps but device B is only receiving 400 kbps, then device B may request, in the TMMBR RTCP message, that device A reduce its transmission rate to 400 kbps or lower.

At Event 2, device A receives the TMMBR RTCP message from device B, and in response, device A reduces its transmission bitrate to, for example, 400 kbps. In order achieve the lower bitrate, device A may do one or more of reduce a frame rate of the video being transmitted, reduce a resolution of the video being transmitted, reduce the number of I-pictures being transmitted, or reduce a sampling rate of the audio being transmitted. If device A reduces the resolution of video being transmitted, then device A may transmit to device B an I-picture as well as a new PPS and SPS for the video. The PPS and SPS may, for example, be transmitted as part of RTP packets 104, while the I-picture is transmitted separately as part of RTP packets 106. At Event 3, in response to receiving the PPS and the SPS which indicate a reduced video resolution, device B may perform a port reconfiguration which includes flushing a buffer storing reference pictures. The reference pictures flushed from the buffer may include the I-picture received as part of packets 106. Device B may not be able to properly decode P- or B-pictures sent subsequent to the flushed I-picture and prior to another I-picture, potentially resulting in a period of poor or no video quality. In order to prevent this period of poor video quality, according to the techniques of this disclosure, device B may be configured to send a request for a second intra-coded (I) picture 108 in response to detecting a flushing of the buffer storing the reference pictures. The request for the second intra coded picture 108 may, for example, be PLI message over RTCP or an FIR message over RTCP. These are examples of such requests. Other types of requests could be used.

In response to receiving a request for the second intra coded picture 108, device A generates and transmits I-picture 110 to device B. After device B receives I-picture 110, then device A and device B can again exchange audio and video data over RTP as well as session information over RTCP (shown in FIG. 1 as packets 112) but at a lower bitrate.

Figure 4:
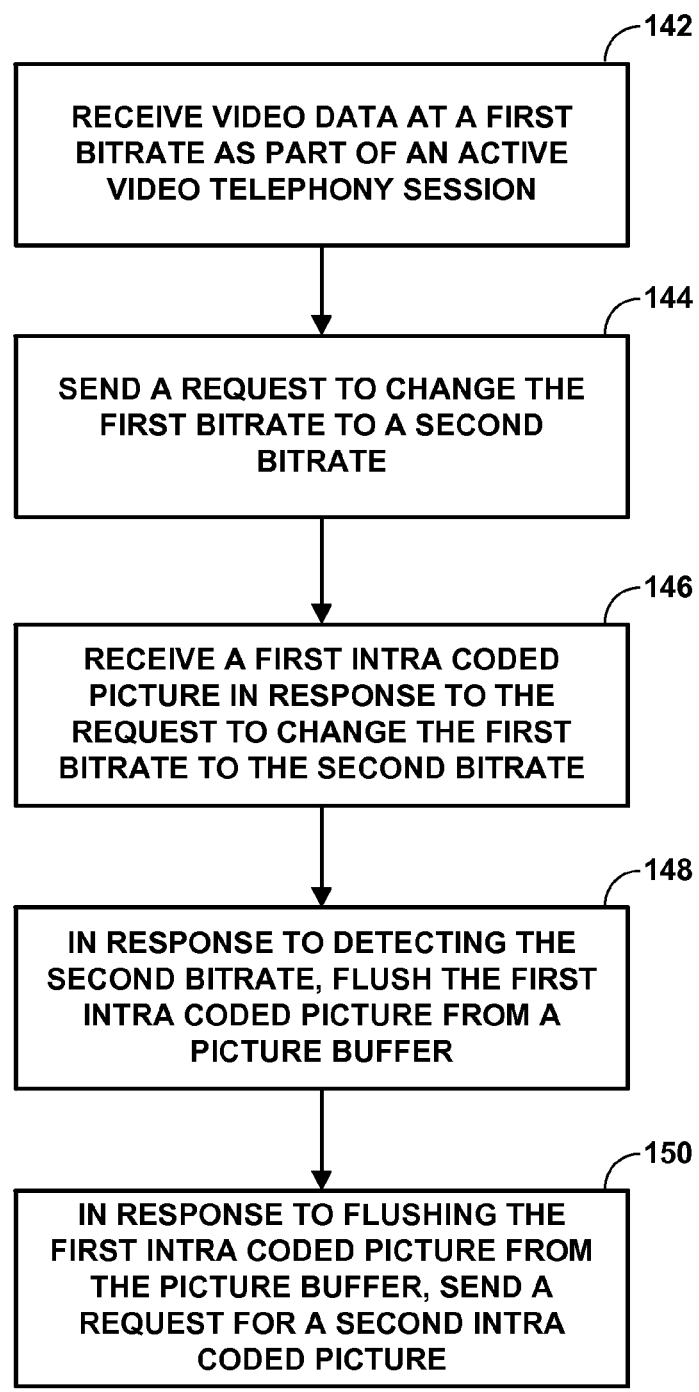
FIG. 4 is a flowchart showing an example video telephony method according to the techniques of this disclosure.

FIG. 4 is a flowchart showing an example VT method according to the techniques of this disclosure. The techniques of FIG. 4 will be described with reference to device 14 of FIG. 1, although the techniques of FIG. 4 are not necessarily limited to any particular type of VT device. Device 14 receives video data at a first bitrate as part of an active video telephony (VT) session (142). Device 14 sends a request to change the first bitrate to a second bitrate (144). The request to change the first bitrate to the second bitrate may, for example, be a TMMBR message over RTCP, and the request to change the first bitrate to the second bitrate may be sent in response to receiving packets at a rate that is less than an indicated packet transmission rate. The second bitrate may be either higher or lower than the first bitrate.

Device 14 receives a first intra coded picture (i.e. I-picture) in response to the request to change the first bitrate to the second bitrate (146). In response to detecting the second bitrate, device 14 flushes the first intra coded picture from a picture buffer (148). Device 14 may, for example, detect the second bitrate by receiving one or both of a PPS or an SPS indicating the second bitrate. Device 14 may, for example, flush the first intra coded picture from the picture buffer as part of a port reconfiguration operation. In response to flushing the first intra coded picture from the picture buffer, device 14 sends a request for a second intra coded picture (150). The request for the intra coded picture may, for example, be a PLI message over RTCP or a FIR message over RTCP.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for video telephony, the method comprising:
receiving video data at a first bitrate as part of an active video telephony session;
sending a request to change the first bitrate to a second bitrate;
receiving a first intra coded picture in response to the request to change the first bitrate to the second bitrate;
in response to detecting the second bitrate, flushing the first intra coded picture from a picture buffer; and
in response to flushing the first intra coded picture from the picture buffer, sending a request for a second intra coded picture.

2. The method of claim 1, further comprising:
receiving the second intra coded picture.

3. The method of claim 1, wherein the request for the second intra coded picture comprises a picture loss indication (PLI) message over real-time transport protocol (RTP) control protocol (RTCP).

4. The method of claim 1, wherein the request for the second intra coded picture comprises a full intra request (FIR) message over real-time transport protocol (RTP) control protocol (RTCP).

5. The method of claim 1, wherein flushing the first intra coded picture from the picture buffer comprises a port reconfiguration operation.

6. The method of claim 1, wherein the request to change the first bitrate to the second bitrate comprises a temporary maximum media stream bitrate request (TMMBR) message over real-time transport protocol (RTP) control protocol (RTCP).

7. The method of claim 1, wherein detecting the second bitrate comprises receiving one or both of a picture parameter set or a sequence parameter set indicating the second bitrate.

8. The method of claim 1, wherein sending the request to change the first bitrate to the second bitrate is performed in response to receiving packets at a rate that is lower than an indicated packet transmission rate.

9. The method of claim 1, wherein the second bitrate is greater than the first bitrate.

10. The method of claim 1, wherein the second bitrate is lower than the first bitrate.

11. An apparatus configured for video telephony, the apparatus comprising:
a receiving device configured to:

receive video data at a first bitrate as part of an active video telephony session;

send a request to change the first bitrate to a second bitrate;

receive a first intra coded picture in response to the request to change the first bitrate to the second bitrate;

in response to detecting the second bitrate, flush the first intra coded picture from a picture buffer; and in response to flushing the first intra coded picture from the picture buffer, send a request for a second intra coded picture.

12. The apparatus of claim 11, wherein the receiving device is further configured to:

receive the second intra coded picture.

13. The apparatus of claim 11, wherein the request for the second intra coded picture comprises a picture loss indication (PLI) message over real-time transport protocol (RTP) control protocol (RTCP).

14. The apparatus of claim 11, wherein the request for the second intra coded picture comprises a full intra request (FIR) message over real-time transport protocol (RTP) control protocol (RTCP).

15. The apparatus of claim 11, wherein the receiving device is further configured to flushing the first intra coded picture from the picture buffer as part of a port reconfiguration operation.

16. The apparatus of claim 11, wherein the request to change the first bitrate to the second bitrate comprises a temporary maximum media stream bitrate request (TMMBR) message over real-time transport protocol (RTP) control protocol (RTCP).

17. The apparatus of claim 11, wherein to detect the second bitrate, the receiving device is further configured to receive one or both of a picture parameter set or a sequence parameter set indicating the second bitrate.

18. The apparatus of claim 11, the receiving device is further configured to send the request to change the first bitrate to the second bitrate in response to receiving packets at a rate that is lower than an indicated packet transmission rate.

19. The apparatus of claim 11, wherein the second bitrate is greater than the first bitrate.

20. The apparatus of claim 11, wherein the second bitrate is lower than the first bitrate.

21. The apparatus of claim 11, wherein the apparatus comprises a wireless device.

22. An apparatus configured to perform video telephony, the apparatus comprising:

means for receiving video data at a first bitrate as part of an active video telephony session;

means for sending a request to change the first bitrate to a second bitrate;

means for receiving a first intra coded picture in response to the request to change the first bitrate to the second bitrate;

means for flushing the first intra coded picture from a picture buffer in response to detecting the second bitrate; and means for sending a request for a second intra coded picture in response to flushing the first intra coded picture from the picture buffer.

23. The apparatus of claim 22, wherein the request for the second intra coded picture comprises a picture loss indication (PLI) message over real-time transport protocol (RTP) control protocol (RTCP).

24. The apparatus of claim 22, wherein the request for the second intra coded picture comprises a full intra request (FIR) message over real-time transport protocol (RTP) control protocol (RTCP).

25. The apparatus of claim 22, wherein the means for flushing the first intra coded picture from the picture buffer comprises means for performing a port reconfiguration operation.

26. A non-transitory computer-readable storage medium storing instructions that when executed by one or more processors cause the one or more processors to:

receive video data at a first bitrate as part of an active video telephony session;

send a request to change the first bitrate to a second bitrate;

receive a first intra coded picture in response to the request to change the first bitrate to the second bitrate;

in response to detecting the second bitrate, flush the first intra coded picture from a picture buffer; and in response to flushing the first intra coded picture from the picture buffer, send a request for a second intra coded picture.

27. The non-transitory computer-readable storage medium of claim 26, wherein the request for the second intra coded picture comprises a picture loss indication (PLI) message over real-time transport protocol (RTP) control protocol (RTCP).

28. The non-transitory computer-readable storage medium of claim 26, wherein the request for the second intra coded picture comprises a full intra request (FIR) message over real-time transport protocol (RTP) control protocol (RTCP).

29. The non-transitory computer-readable storage medium of claim 26, wherein to flush the first intra coded picture from the picture buffer, the instructions cause the one or more processors to perform a port reconfiguration operation.

30. The non-transitory computer-readable storage medium of claim 26, wherein to detect the second bitrate, the instructions cause the one or more processors to receive one or both of a picture parameter set or a sequence parameter set indicating the second bitrate.

\* \* \* \* \*